United States Patent
Dalzell et al.

(10) Patent No.: US 6,606,362 B1
(45) Date of Patent: Aug. 12, 2003

(54) SYNCHRONIZATION IN A TELECOMMUNICATIONS NETWORK

(75) Inventors: Gareth Dalzell, Ballynure (GB); David M Goodman, St Albans (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/342,363

(22) Filed: Jun. 29, 1999

(51) Int. Cl.[7] .............................. H04L 7/00; H04L 5/14
(52) U.S. Cl. ........................................ 375/356; 370/294
(58) Field of Search ................................. 370/165, 324, 370/471, 503–519, 907, 294, 402, 405; 375/145–356, 371–375; 340/2.23; 377/47; 327/292–3, 141; 714/4, 707; 709/400

(56) References Cited

U.S. PATENT DOCUMENTS

| | | | | |
|---|---|---|---|---|
| 4,596,982 A | * | 6/1986 | Bahr et al. .................. 340/2.23 |
| 5,327,427 A | * | 7/1994 | Sandesara ................. 340/825.5 |
| 5,901,136 A | * | 5/1999 | Lovelace et al. ........... 370/217 |
| 6,014,414 A | * | 1/2000 | Yamamoto et al. ........... 377/47 |
| 6,141,325 A | * | 10/2000 | Gerstel ....................... 370/238 |
| 6,185,216 B1 | * | 2/2001 | Chapman .................... 370/294 |
| 6,185,247 B1 | * | 2/2001 | Williams et al. ............ 370/503 |
| 6,262,996 B1 | * | 7/2001 | Kainulainen et al. ....... 370/503 |

* cited by examiner

Primary Examiner—Stephen Chin
Assistant Examiner—Lawrence Williams
(74) Attorney, Agent, or Firm—Barnes & Thornburg

(57) ABSTRACT

A synchronous digital communications network incorporating a number of nodes arranged in path protected rings and has two or more timing reference sources. The reference sources each allocated an artificial ranking of unique quality level values and these quality level values are transmitted as a section overhead message to provide a unique identifier for each source. Identification of the source to a node enables that node to be aware of a synchronization signal that has in fact originated from that node so as to prevent the setting up of synchronization loops. In a further embodiment the technique is extended to protection path identification for signals coupled between adjacent rings in a network having ring topology.

10 Claims, 6 Drawing Sheets

| QL Message | | | | Quality level | ITU Description | ANSI |
|---|---|---|---|---|---|---|
| b5 | b6 | b7 | b8 | | | |
| 0 | 0 | 0 | 0 | 0 | Synchronisation Quality Unknown | Sync traceability unknown (ANSI QL 2 see Note 2) |
| 0 | 0 | 0 | 1 | 1 | Reserved for future use | Stratum 1 Traceable |
| 0 | 0 | 1 | 0 | 2 | Traceable to G.811 | |
| 0 | 0 | 1 | 1 | 3 | Reserved for future use | |
| 0 | 1 | 0 | 0 | 4 | G.812 Transit Clock | |
| 0 | 1 | 0 | 1 | 5 | Reserved for future use | |
| 0 | 1 | 1 | 0 | 6 | Reserved for future use | Stratum 2 Traceable |
| 0 | 1 | 1 | 1 | 7 | Reserved for future use | |
| 1 | 0 | 0 | 0 | 8 | G.812 Local Clock | |
| 1 | 0 | 0 | 1 | 9 | Reserved for future use | Stratum 3 Traceable |
| 1 | 0 | 1 | 0 | 10 | Reserved for future use | |
| 1 | 0 | 1 | 1 | 11 | Traceable to SEC Equipment | |
| 1 | 1 | 0 | 0 | 12 | Reserved for future use | ±20 ppm Clock Traceable |
| 1 | 1 | 0 | 1 | 13 | Reserved for future use | |
| 1 | 1 | 1 | 0 | 14 | Reserved for future use | Reserved for Network Synchronisation |
| 1 | 1 | 1 | 1 | 15 | Not to be used for Synchronisation | Don't Use for Synchronisation |

*Fig. 1*

SYNCHRONIZATION IN A TELECOMMUNICATIONS NETWORK

FIELD OF THE INVENTION

This invention relates to methods and arrangements for achieving synchronization of network elements in a telecommunications synchronous network.

BACKGROUND OF THE INVENTION

Synchronous transport techniques are becoming widely used in the telecommunications field. The standard protocol for synchronous transport is commonly referred to as the synchronous digital hierarchy (SDH) or, in North America, as SONET. The traffic in such networks is transported in frames which are multiplexed up into virtual containers at various levels of multiplexing. A key requirement in a synchronous system is that each network element receives a timing or clock reference whereby it can adjust its local timing to ensure synchronization. Synchronous networks have the significant advantage of simplifying the process of switching and of demultiplexing channels and thus avoid the need for the so-called multiplexer/demultiplexer mountains that were associated with previous plesiochronous techniques.

Typically such a network embodies a backbone ring topology comprising a number of interconnected rings. This topology is widely used as it facilitates the provision of built-in protection paths for the network elements or nodes. Traffic can pass in both directions around a ring. In the event of failure of part of a ring, the nodes or elements in that ring can still receive and transmit over the remaining part of the ring.

A particular problem that is inherent in such a ring structure is that of preventing the establishment of synchronization loops either on system set up or during recovery from a fault such as a fibre break. In a typical synchronous network, timing of a network element is derived from one of a number of highly accurate reference sources, e.g. atomic clocks, that are distributed around the network.

In paractice, a network element will receive the synchronization signal either directly from such a source or relayed from an adjacent element that is already synchronized to the source. For protection purposes it is necessary that a network element can synchronize from an alternative source, in the the event of a failure of a ring fibre path, to that which that element is currently synchronized. This facility to synchronize from an alternative source has however been found difficult to timplement in a ring network. In a ring based network where each network element or node can access two or more substantially identical synchronization sources, there is risk of establishing a closed synchronization loop, i.e. positive feedback. Under such conditions, the network element may erroneously attempt to synchronize with itself around the ring with a consequent loss of timing accuracy. This is a particular problem following failure of one synchronization with an alternative source. Under such conditions, a ring element or node has no means of determining whether a received signal to which it is attempting to synchronize has originated from an active synchronization source, or whether that signal has in fact originated from the node itself and has been relayed around the ring. To reduce or prevent the risk of such an occurrence, the network desginer will normally deliberately limit the number of allowed synchronizations paths in a ring. However, this in turn reduces the robustness of the ring to other system faluts.

A further problem is that of carrying the synchronization signal between adjacent rings of the network. In order to provide the required protection, it is necessary to provide two paths between the rings. These paths carry identical signals, including synchronization signals, but only one path will be selected as the traffic and signal carrying path. If that path fails, causing the second path to be selected, the nodes within the ring being served will automatically attempt to synchronize to the signal carried on the second path. However, a node in the ring will have no way of telling whether a received synchronization signal has arrived via the second path or whether that signal has originated from the node itself and been transmitted around the ring. Currently this problem is addressed by appropriate design of 'subsidiary' ring nodes, but this is inconvenient as it then requires different products to be manufactured and supplied.

SUMMARY OF THE INVENTION

An object of the invention is to minimize or to overcome the above disadvantages.

A further object of the invention is to provide an improved arrangement and method for synchronization of a network element in a synchronous telecommunications network.

According to a first aspect of the invention, there is provided a synchronous digital communications network comprising a plurality of network elements interconnected by communications paths, and having a plurality of synchronization timing reference sources for providing timing signals to which said network elements can synchronize, and wherein each said synchronization source is allocated a respective unique identity whereby each said network element is informed of the identity of the derivation of the timing reference signal to which that element is synchronized.

According to a further aspect of the invention, there is provided a method of synchronizing a synchronous digital communications network comprising a plurality of network elements interconnected by communications paths, and having a plurality of synchronization timing reference sources for providing timing signals to which said network elements can synchronize, the method comprising allocating to each said synchronization source a respective unique identity, and transmitting said timing signals each together with the respective unique identifier to the network elements whereby each said network element is informed of the identity of the timing reference source to which that element is synchronized.

According to a further aspect of the invention, there is provided a method of synchronizing a synchronous network element to a synchronization signal in a telecommunications network, the method including providing to that network element an indication of the origin of the synchronization signal so as to avoid use by the network element of a synchronization signal originating from itself.

According to another aspect of the invention, there is provided a method of synchronizing a first synchronous network ring to a second synchronous network ring via first and second paths via which paths said rings are coupled, the method comprising, at the first ring, transmitting an identical timing reference signal together with an identifier for that timing signal on each said path from the first ring to the second ring, and, at the second ring, receiving said timing signals from the first and second paths, providing said received timing signals with respective first and second new identifiers, and selecting either one or the other of said newly identified timing signals for synchronization of the second ring.

According to another aspect of the invention, there is provided a synchronous digital communications network incorporating a plurality of network elements or nodes interconnected by communications paths, said network having a primary synchronization timing reference source to which all network nodes are synchronized, and a secondary, stand-by synchronization source with which said elements or nodes can synchronize in the event of failure of the primary reference source, and wherein said reference sources are each provided with a respective identifier whereby each said network element or node is informed of the identity of the timing reference source to which that element or node is synchronized.

According to a further aspect of the invention, there is provided a method of synchronizing a network element in a synchronous digital communications network incorporating a plurality of network elements disposed in path protected rings and having two or more timing reference sources, the method comprising; allocating a unique identifier comprising an artificial ranking to said reference sources such that one source is identified by a highest artificial ranking as a primary reference source, the other source or sources being respectively lower ranked as stand-by reference sources, synchronizing each said element to the primary reference source, and, in the event of a failure of the primary reference source, inhibiting further use of that source by each said network element and synchronizing each said network element with the next available highest ranked stand-by source.

According to another aspect of the invention, there is provided a synchronous digital communications network incorporating a plurality of network elements disposed in path protected rings and having two or more timing reference sources, said reference sources each being allocated a ranking such that one source is highest ranked as a primary reference source, the other source or sources being respectively lower ranked as stand-by reference sources, synchronizing means disposed at each said element for effecting synchronization of that element to the primary reference source, and control means responsive to a failure of the primary reference source for barring further use of that source by each said network element and for instructing each said network element to synchronize with the highest ranked stand-by source.

According to a further aspect of the invention, there is provided a network node or element for use in a synchronous digital communications network incorporating a plurality of network elements disposed in path protected rings and having two or more timing reference sources, said reference sources each being allocated a ranking such that one source is highest ranked as a primary reference source, the other source or sources being respectively lower ranked as stand-by reference sources, wherein the node the incorporates; a local oscillator, means for receiving preferentially a synchronization signal from said primary reference source so as to synchronize the local oscillator with that synchronization signal, output means for forwarding the synchronization signal to an adjacent node, and means responsive to a failure of the primary reference source for barring further use of that source by said network node and for synchronizing said network node oscillator with the highest ranked stand-by source.

The method permits a network element to be aware that a synchronization signal with which it could synchronize has in fact originated from the network itself and should therefore not be used thus preventing the establishment of a synchronization loop.

Conveniently, the synchronization reference sources are given each a unique ranked quality level (QL) by the operator via the network manager, the primary source being ranked at the highest level (QL 1), the one or more secondary or stand-by sources being ranked at respective lower levels. This quality level can be transmitted in the section overhead (SOH) to provide to a node receiving the synchronization signal a unique identifier of the source from which that timing reference signal has originated. In a further embodiment, the quality level message can be modified to indicate to a receiving node the path whereby that message has reached the node, e.g. so as to differentiate between a pair of paths in a protection arrangement.

It will be understood that the techniques described herein are applicable both to the North American SONET (ANSI) standard and to the European SDH (ITU) standard.

BRIEF DESCRIPTION OF THE DRAWINGS

An embodiment of the invention will now be described with reference to the accompanying drawings in which:

FIG. 1 is a table detailing the currently employed synchronization status (SSM) messages;

DETAILED DESCRIPTION OF PREFERRED EMBODIMENTS

Referring first to FIG. 1, which is introduced here for comparative and explanatory purposes, this details the synchronization status messages (SSM) that are employed in the current ITU and ANSI standards. A synchronization signal from a source is provided with an associated quality level (QL) status message byte that is transmitted in the byte S1 of the section overhead (SOH). The quality status message indicates the quality of the source and, in a network, a number of sources will have the same quality level associated therewith.

Figure 2:
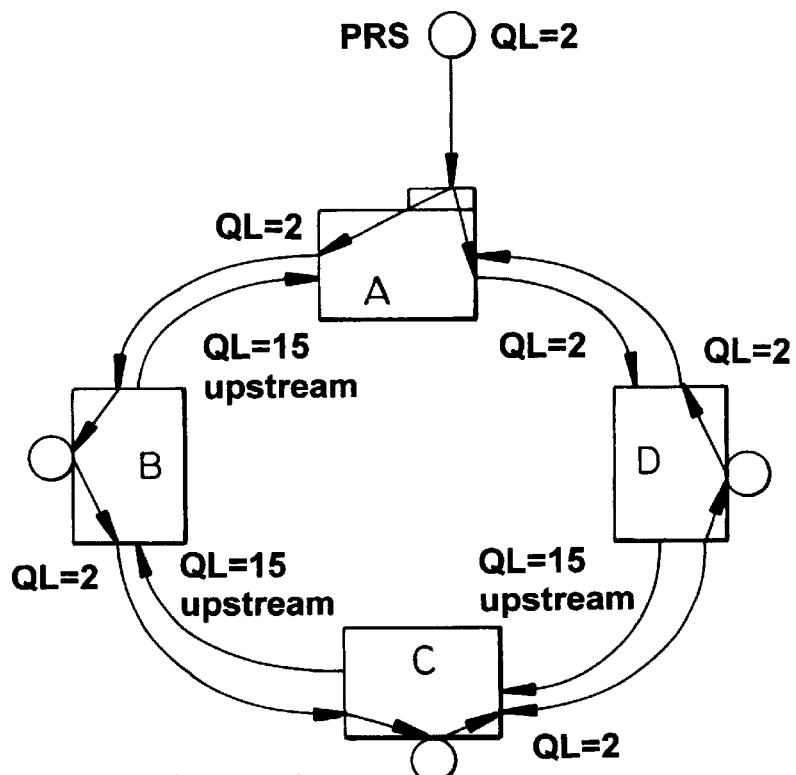
FIGS. 2 and 3 illustrate the process of reconfiguration of a synchronous network ring.
Figure 3:
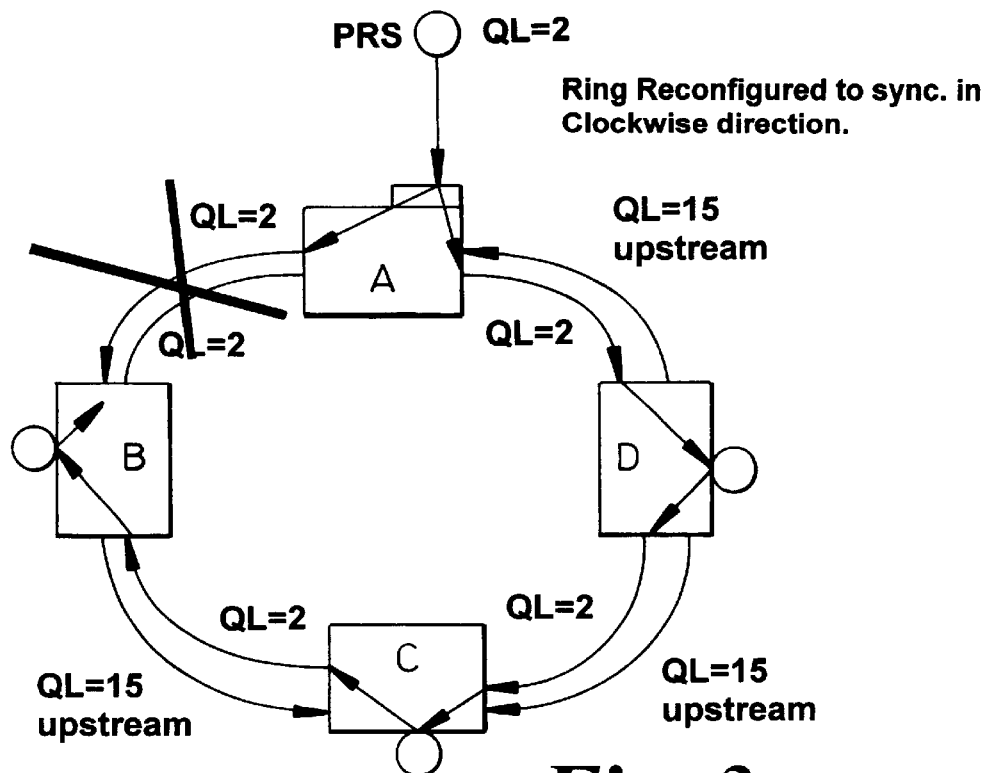

Referring now to FIGS. 2 and 3, these Figures illustrate the process of reconfiguration of a synchronous network ring following a fibre breakage and are introduced here for comparative and explanatory purposes. The ring structure shown schematically comprises four nodes A, B, C and D one of which (A) is coupled to a synchronization primary reference source PRS. Each node is programmed to perform the following algorithm with respect to synchronization status messages:

Choose the reference source with the highest quality level.

If all sources have equal quality level, choose the source with the highest priority.

Return the 'do not use' message.

The source priority is configured individually in each node to establish a synchronization plan.

In the schematic network of FIG. 1, the following status messages are transmitted in the section overhead:

A QL=2 message associated with the timing signal from the primary reference source.

A clock traceable to a synchronous equipment clock has an associated QL=11 message.

The 'do not use' message is QL=15.

As shown in FIG. 2, the nodes B, C and D have been synchronized by passing the PRS clock and the QL=2 message around the ring in an anti-clockwise direction. The nodes B, C and D return the QL=15 message in the opposite direction. Node A also sends the QL=2 message in a clockwise direction to node D.

FIG. 3 illustrates the effect of a path failure or fibre break between nodes A and B in response to the loss of synchronization input, node B enters an emergency 'holdover' condition in which it uses its own internal clock as a temporary synchronization reference, and transmits this temporary clock together with the associated QL=15 message downstream to nodes C and D. As node D receives a QL=15 message from node C and a QL=2 message from node A in the clockwise direction, node D runs its algorithm and reconfigures to synchronize to the source PRS from node A. Node D transmits the QL=15 message back to node A and transmits the synchronizaton signal with the QL=2 message clockwise around the ring to node C. Similarly, nodes C and B in turn run the algorithm so that they each synchronize to the reference source and the ring becomes reconfigured.

Having reviewed the background art, preferred embodiments of the invention will now be described with reference to FIGS. 4 to 7 below.

Figure 4:
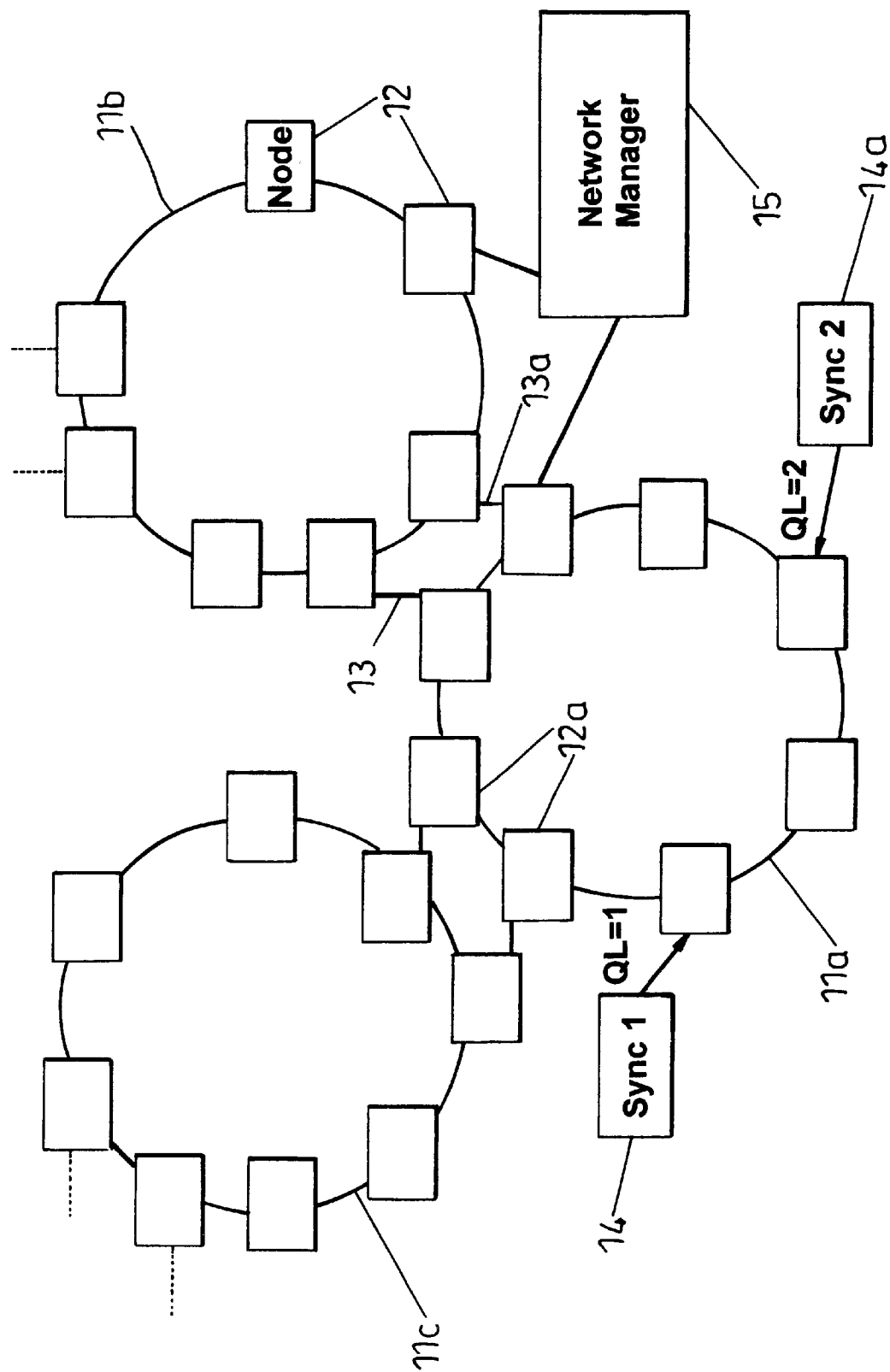
FIG. 4 is a general view of a synchronous communications network according to a preferred embodiment of the invention and embodying a ring topology.

Referring now to FIG. 4, this depicts part of a synchronous digital communications network comprising a number of optical fibre rings 11 (a, b, c) each incorporating a number of nodes 12. The ring topology provides each node with a protection path in that traffic can reach the node in either direction, commonly referred to as East and West, around the ring. In practice, traffic is duplicated in the two ring directions, and each node selects one or other of the two identical traffic streams. In the event of a failure of the currently received stream e.g. as a result of a fibre breakage in the ring, the node then switches to receive the traffic on the protection path in the opposite direction so that there is effectively no loss of transmission The individual rings are coupled via protected pairs of paths 13 between adjacent nodes 12a to establish a backbone transport network. Thus, if one of the connecting paths 13 between two adjacent rings fails, inter-ring traffic can still be carried on the remaining path.

The system also includes a timing reference or clock source 14, whereby each network element or node can synchronize its own local timing to that of the network, and one or more stand-by reference sources 14a. In the arrangement of FIG. 1 the entire network is, under normal operating conditions, synchronized to the one reference source 14 so that the network is thus fully synchronized. The standby source 14a is fully functional, but will only be used as a reference source in the event of a failure of the primary source 14. The network is controlled and supervised by a network manager 15.

In the network of FIG. 4, each synchronization source 14, 14a, . . . is accorded a unique quality level (QL) by the network operator, e.g. via the network manager. The primary source 14 is allocated the highest quality level, QL=1, while the standby source 14a is allocated the next lower quality level, QL=2. Any further standby sources where these are provided, are allocated successively lower quality levels, QL=3 etc. so as to provide a ranking of sources. It will be appreciated that this ranking is in effect artificial and arbitrary as the sources will in fact all be of similar or identical high quality.

However, the artificial QL ranking serves effectively as a means of uniquely identifying each source to the network elements via the QL message carried in the section overhead. Each network element or node is arranged to synchronize only with the highest ranked available source, i.e. the source with the lowest QL value identifier so that, under normal operating conditions, each element or node will synchronize preferentially directly or indirectly with the primary source 14 having a QL=1 quality level. Under these conditions, each element is then inhibited from synchronizing with any other source of a lower ranked quality level.

In the exemplary network of FIG. 4, one ring 11a, to which the synchronization sources 14, 14a are coupled is designated as a primary ring, while the other network rings 11b and 11c comprise subsidiary rings forming a hierarchy for synchronization purposes. This hierarchy may comprise for example (using SOH terminology) a primary STM16 ring coupled to a number of STM4 rings which are each in turn coupled to a respective number of STM1 rings. It will however be understood that the synchronization techniques described herein are not limited to this particular ring configuration.

Figure 5:
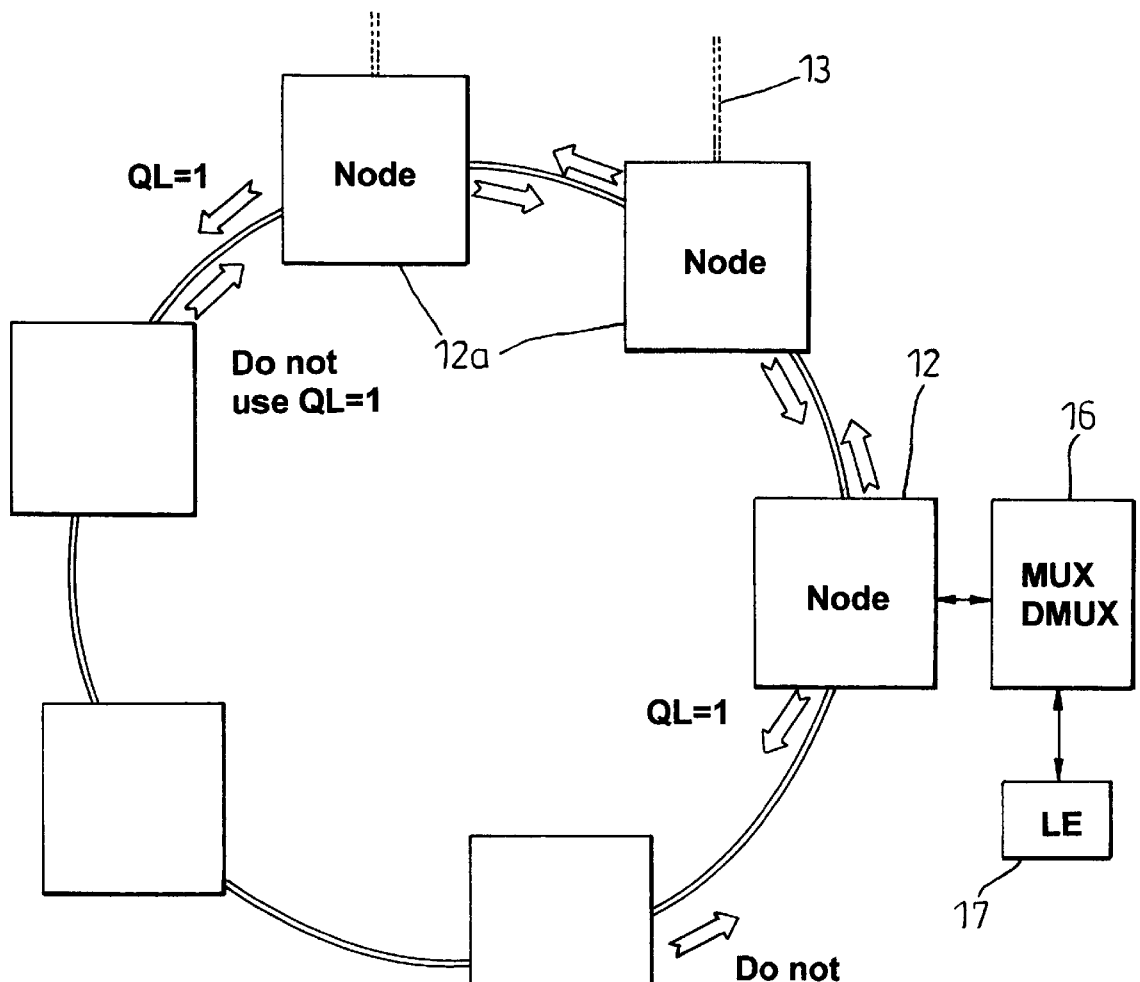
FIG. 5 is a schematic diagram of a ring of the network of FIG. 4 illustrating synchronization paths in the network.

The general construction of a ring comprising a number of nodes is depicted in FIG. 5. The ring shown by way of example is a subsidiary ring. Each element or node 12 in the ring receives the synchronization signal via an adjacent node and can then relay this signal to the next adjacent node in the ring. Because of the bi-directional nature of the ring providing the necessary path protection, each node 12 has both transmit and receive paths (e.g. in East and West directions) available to its immediate neighbours. In order to prevent a synchronization loop from being established around the ring, each node or element receiving the QL=1 synchronization signal from its immediate neighbour in one ring direction, transmits back to that neighbour in the opposite ring direction a 'do not use' or QL=15 signal barring use by that neighbour of the synchronization signal in that opposite direction.

As shown in FIG. 5, each node 12 provides a point at which traffic can be dropped out from the ring or added to the ring via a multiplexer/demultiplexer 16 coupled e.g. to a local exchange (LE) 17.

In the event of a failure of the primary reference source 14, the network elements or nodes, which have already been programmed by the network manager 15, each reconfigure to synchronize to the next highest ranked available source, i.e. the source 14a having an allocated or artificial quality level of QL=2, synchronization of all other lower quality levels thus being inhibited. Advantageously, this reconfiguration is programmed into the network nodes via the network manager at system start up.

Figure 6:
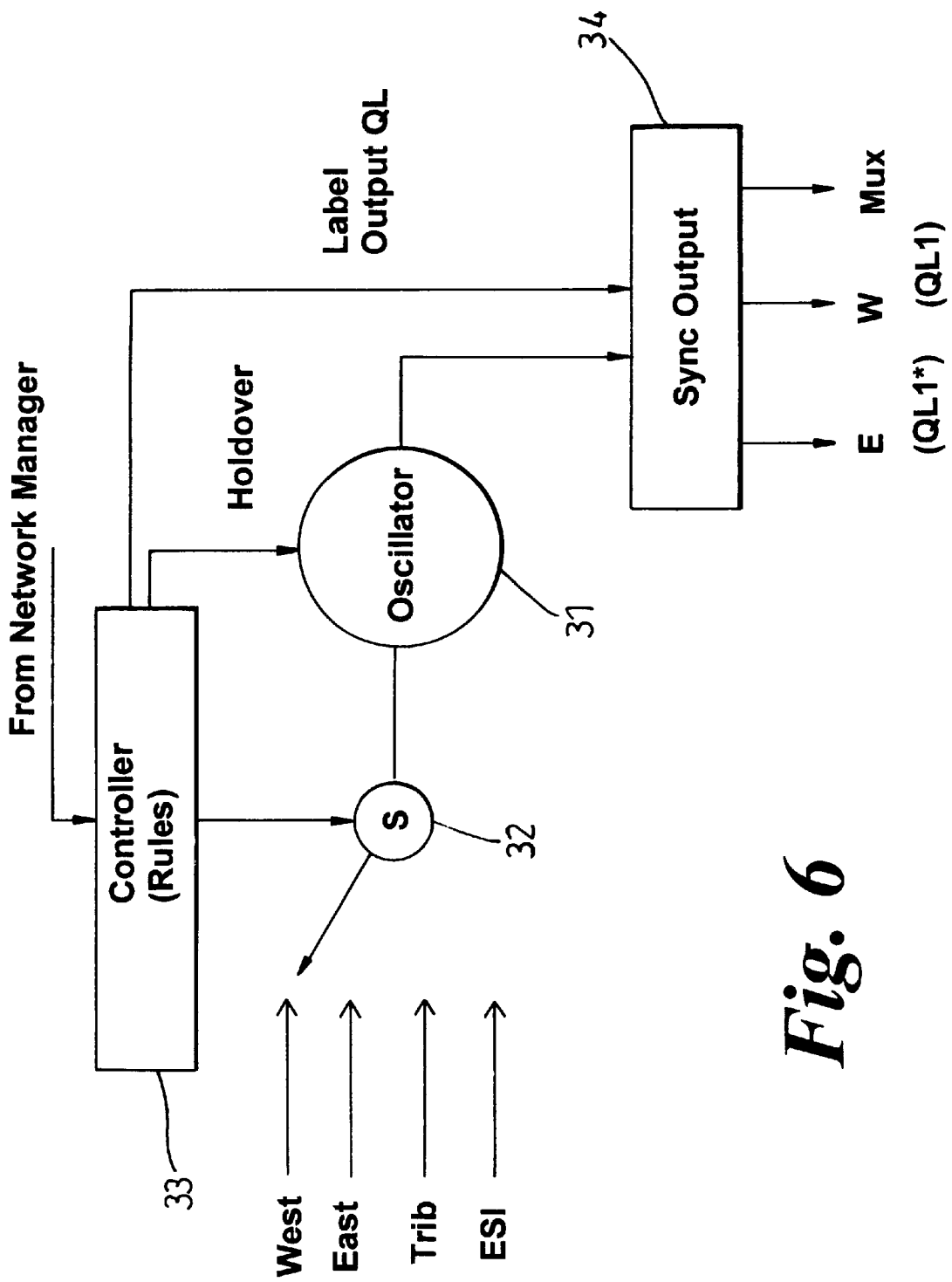
FIG. 6 shows the general construction of a network node of the network of FIG. 4.

In some applications, the synchronization source may be a sync supply unit (SSU) which derives its synchronization from the network element, but removes degradation from the synchronization signal. The QL value of the SSU will of course be that of the original synchronization source 14 which is known to the network element via the network manager. This QL value becomes a hold-over value QL=11 in the event of failure of the original synchronization source 14. I.e., where there is a total failure of the synchronization signal, the node is programmed to provide its own internal clock until such time as a synchronization signal becomes available FIG. 6 illustrates in highly schematic form the construction of a network node. For clarity, only those parts of the node relevant to the synchronization process are depicted. As shown in FIG. 6, the node incorporates a local oscillator 31 which, under normal conditions, is synchronized to the QL=1 synchronization source. The node has east and west inputs corresponding to the two ring directions, and two further inputs, tributary and external synchronization. The latter input will be used where the node receives its signal directly from the synchronization source. In normal use, the switch 32 will couple the local oscillator 31 to either the East or West input, the other two inputs representing default conditions. The switch 32 operated by a controller 33 provided with a set of operating rules via the network manager. Generally, these operating rules or instructions will be provided at system start up, although they can of course be updated as required during operation of the network.

In normal use, the oscillator 31 synchronizes to the QL1 signal received from either the East or West direction, and outputs this synchronized signal to the ring in the East and West directions via output circuit 34. One or more further outputs may be provided, e.g. to synchronize one or more multiplexers attached to the node. The controller 33 provides labeling of these outputs too indicate each output signal is or is not available for use as a synchronization signal by the receiving node. Thus, in the configuration shown in FIG. 3, where the West input has been selected as the synchronization input, the West output to the next adjacent ring node incorporates a QL1_enable signal indicating to the receiving node that this signal is valid. However, the East output incorporates a QL1_do_not use (QL1) to ensure that the ring node from which the synchronization signal was previously received does not attempt to synchronize with the returned signal. This prevents the setting up of synchronization loops around the ring.

A further output from the controller 33 is used to "hold over" the oscillator 31 under default conditions when a total loss of the synchronization input has occurred. The oscillator then provides the node with its own emergency timing reference until such time as the network synchronization input is restored. Under these conditions the controller labels each output with an indication that the synchronization signal is an emergency signal to be used only if no other signal is available.

In a further embodiment, the operator can configure a QL threshold to a network element synchronization input or output by configuring a mapping table for the synchronization port which translates incoming QLs to other desirable QLs. The threshold may then be used to squelch a synchronization output if the corresponding QL is below the threshold, and to convert a range of QLs from a network synchronization source to a single QL value emulating a present/absent synchronization source. This is of particular advantage when coupling the synchronization signal between adjacent rings. The technique is illustrated in FIG. 7 which shows portions of an adjacent pair of rings.

Figure 7:
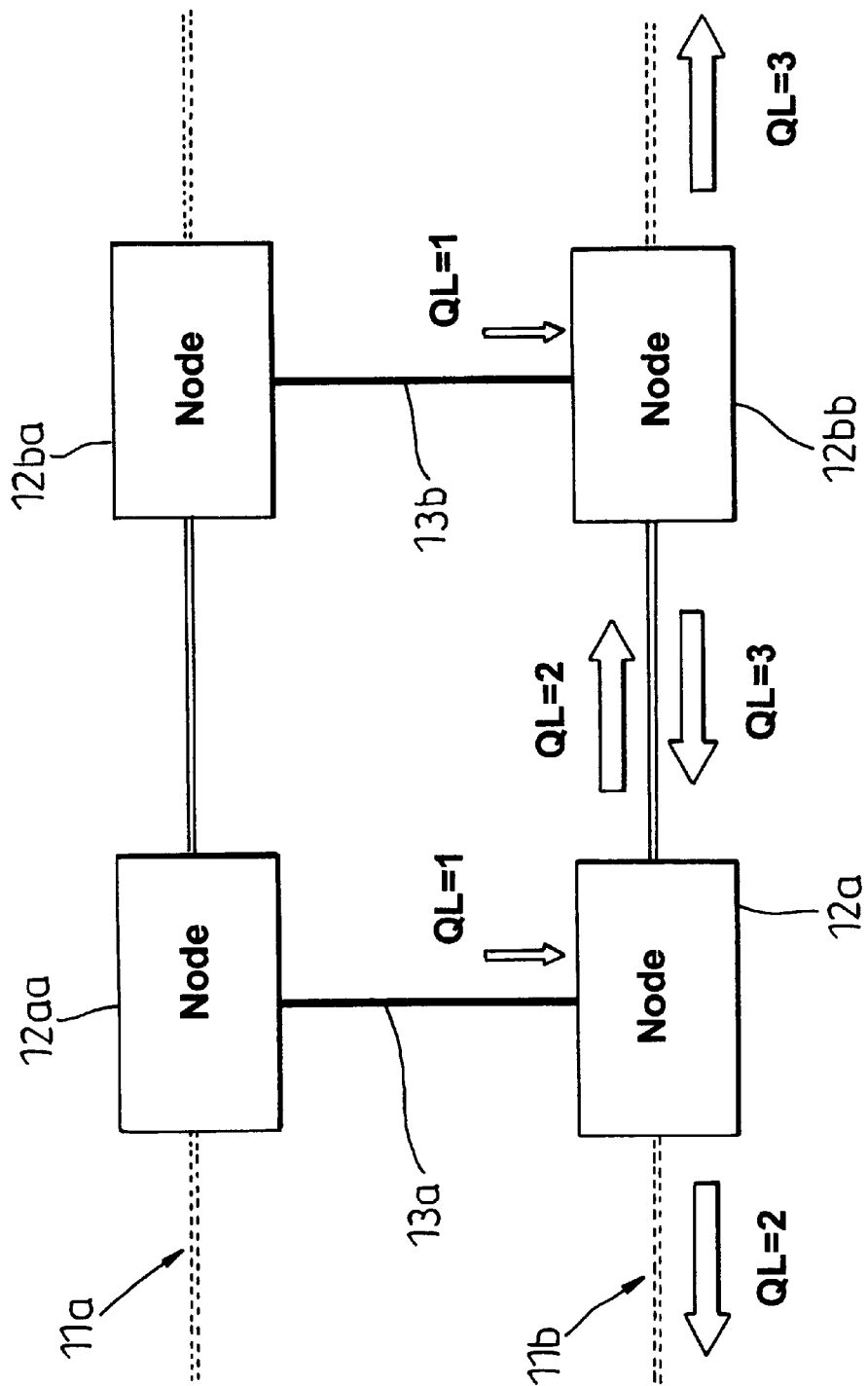
FIG. 7 shows a mechanism for coupling synchronization signals between adjacent rings in the network of FIG. 4.

As depicted in FIG. 7, the adjacent rings 11a, 11b are coupled via respective paths 13a and 13b between respective pairs of nodes 12aa, 12ba and 12ab, 12bb. Identical signals are transmitted over the paths 13a and 13b, but only one path, e.g. 13a, is selected at any one time, the remaining path 13b constituting a protection path in the event of a fault. The QL identifier value transmitted on each path will also be identical and, for the present purposes is numerically less than a threshold value. Typically this QL value is less than 4.

The synchronization signal is received together with the QL message in the section overhead by both nodes 12ab and 12bb in the ring 11b. The QL message in the overhead is then converted by each receiving node to a respective new QL value for transmission around the ring 11b according to the following algorithms stored in the respective nodes.

In node 12ab
If received QL is less than 4, generate new QL=2
If received QL is greater than or equal to 4, generate new QL=15
In node 12bb
If received QL is less than 4, generate new QL=3
If received QL is greater than or equal to 4, generate new QL=15

In this way, the two paths 13a and 13b, which effectively appear to the ring 11b as primary and standby synchronization reference sources, are provided with respective unique identifiers. Each node in the ring 11b will, under normal conditions where QL=2 and QL=3 messages are both present, synchronize preferentially to the QL=2 clock from the main path 13a. If this path fails so that the QL=2 message is lost, all nodes will then synchronize to the QL=3 clock from the protection path 13b so as to reconfigure the ring.

It will be understood that the above description of a preferred embodiment is given by way of example only and that various modifications may be made by those skilled in the art without departing from the spirit and scope of the invention.

What is claimed is:

1. A synchronous digital communications network comprising a plurality of network elements interconnected by communications paths, and having a plurality of synchronization timing reference sources for providing timing signals to which said network elements can synchronize, and wherein each said synchronization source is allocated a respective unique identity comprising a quality level allocated to that source and carried in the network as a section overhead message whereby each said network element is informed of the identity of the derivation of the timing reference signal to which that element is synchronized, wherein said network elements are disposed in a plurality of synchronous rings which are interconnected by pairs of paths between adjacent rings, each said path pair providing path protection between the rings and said rings comprise a hierarchy of a primary ring and subsidiary rings.

2. A network as claimed in claim 1, and having means for providing first and second quality level signals for synchronization signals carried respectively on first and second paths of a said pair whereby to identify the derivation of those synchronization signals to a said receiving element.

3. A method of synchronizing a synchronous digital communications network comprising a plurality of network elements interconnected by communications paths, and having a plurality of synchronization timing reference sources for providing timing signals to which said network elements or nodes can synchronize, said network elements being disposed in a plurality of synchronous rings which are interconnected by pairs of paths between adjacent rings, each said path pair providing path protection between the rings, the method comprising allocating to each said synchronization source a respective unique identity, and transmitting said timing signals each together with the respective unique identity to the network elements whereby each said network element is informed of the identity of the timing reference source to which that element is synchronized, wherein the unique identifier comprises a quality level assigned to a said source and the source quality level is transmitted to the network elements or nodes as a section overhead message, the method including the step of providing first and second quality level signals for synchronization signals carried respectively on first and second paths of a said pair in order to identify the derivation of those synchronization signals to a receiving element.

4. A method of synchronizing a first synchronous network ring to a second synchronous network ring via first and second paths via which paths said rings are coupled, the method comprising, at the first ring, transmitting an identical timing reference signal on each said path from the first ring to the second ring, and, at the second ring, receiving said timing signals from the first and second paths, providing said received timing signals with respective first and second identifiers, and selecting one of said newly identified timing signals for synchronization of the second ring.

5. A method of synchronizing a network element in a synchronous digital communications network incorporating a plurality of network elements disposed in protected rings and having two or more timing reference sources, the method comprising; allocating to each said source a unique identity comprising a quality level allocated to that source and carried in the network as a section overhead message such that one source is identified by a highest artificial ranking as a primary reference source, the other source or sources being respectively lower ranked as stand-by reference sources, synchronizing each said element to the primary reference source, and, in the event of a failure of the primary reference source, inhibiting further use of that source by each said network element and synchronizing each said network element with the next available highest ranked stand-by source.

6. A synchronous digital communications network incorporating a plurality of network elements disposed in protected rings and having two or more timing reference sources, said reference sources each being allocated a respective unique identity comprising a quality level allocated to that source and carried in the network as a section overhead message such that one source is highest ranked as a primary reference source, the other source or sources being respectively lower ranked as stand-by reference sources, synchronizing means disposed at each said element for effecting synchronization of that element to the primary reference source, or, in the event of failure of that source, to the next available highest ranked stand-by source.

7. A synchronous digital communications network comprising a first synchronous network ring coupled via first and second paths to a second synchronous network ring, means at said first ring for transmitting an identical timing reference signal on each of said first and second paths, means at said second ring for receiving said identical timing reference signals and for assigning each received timing reference signal with a unique identifier, and means at said second ring for selecting one of said uniquely identified timing reference signals as a basis for synchronization of the second ring.

8. A network element for a communications network incorporating a plurality of network elements disposed in protected rings and having two or more timing reference sources, said reference sources each being allocated a respective unique identity comprising a quality level allocated to that source and carried in the network as a section overhead message such that one source is highest ranked as a primary reference source, the other source or sources being respectively lower ranked as stand-by reference sources, said network element including synchronizing means for effecting synchronization of said network element to the primary reference source, or, in the event of failure of that source, to the next available highest ranked standby source.

9. A synchronous digital communications network comprising a plurality of network elements interconnected by communications paths, and having a plurality of synchronization timing reference sources for providing timing signals to which said network elements can synchronize, and wherein each said synchronization source is allocated a respective unique identity comprising a quality level allocated to that source and carried in the network as a section overhead message whereby each said network element is informed of the identity of the derivation of the timing reference signal to which that element is synchronized, wherein said network elements are disposed in a plurality of synchronous rings which are interconnected by pairs of paths between adjacent rings, each said path pair providing path protection between the rings and having means for providing first and second quality level signals for synchronization signals carried respectively on first and second paths of a said pair whereby to identify the derivation of those synchronization signals to a said receiving element.

10. A network as claimed in claim 9, and comprising a hierarchy of a primary ring and subsidiary rings.

* * * * *